US012621014B2

(12) United States Patent
Kimura

(10) Patent No.: US 12,621,014 B2
(45) Date of Patent: May 5, 2026

(54) SHIP INFORMATION EXCHANGE DEVICE, SHIP INFORMATION EXCHANGE METHOD AND SHIP INFORMATION EXCHANGE PROGRAM

(71) Applicant: FURUNO ELECTRIC CO., LTD., Hyogo (JP)

(72) Inventor: Daisuke Kimura, Ashiya (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 60 days.

(21) Appl. No.: 18/901,386

(22) Filed: Sep. 30, 2024

(65) Prior Publication Data

US 2025/0023595 A1     Jan. 16, 2025

Related U.S. Application Data

(63) Continuation-in-part of application No. PCT/JP2023/008502, filed on Mar. 7, 2023.

(30) Foreign Application Priority Data

Mar. 31, 2022     (JP) ................................. 2022-058446

(51) Int. Cl.
    *H04B 1/16*            (2006.01)
(52) U.S. Cl.
    CPC ...................................... *H04B 1/16* (2013.01)
(58) Field of Classification Search
    CPC ......... H04L 2027/0026; H04L 27/0014; H04L
            1/004; H04L 1/0054; H04L 25/03019;
            H04L 27/144; H04L 27/2656; H04L 27/2657; H04L 5/0053; H04L 5/0092;
H04L 1/02; H04L 2025/03414; H04B
1/16; H04B 7/08; H04B 7/18517; H04B
7/10; H04B 7/185; H04B 1/30; H04B
7/18508;

(Continued)

(56) References Cited

U.S. PATENT DOCUMENTS 8,665,997 B1 *   3/2014  Smith ................. H04L 27/2017
                                                            375/340
9,369,316 B2 *   6/2016  Kim ........................ H04L 27/38
                    (Continued)

FOREIGN PATENT DOCUMENTS

JP          2007-251931 A       9/2007
JP          2012-034287 A       2/2012

OTHER PUBLICATIONS

International Search Report issued in PCT/JP2023/008502; mailed Apr. 11, 2023.

*Primary Examiner* — Eva Y Puente
(74) *Attorney, Agent, or Firm* — Studebaker Brackett PLLC

(57) ABSTRACT

A ship information exchange device capable of reducing a demodulation processing load is provided. The ship information exchange device includes a receiver, a generator, a detector, and a demodulator. The receiver receives a radio signal. The generator generates reception data of a plurality of channels used for transmission of ship information based on the radio signal. The detector detects a reception level of each of the channels. The demodulator demodulates the reception data. The demodulator determines the reception data to be demodulated according to the detection result of the reception levels.

16 Claims, 7 Drawing Sheets

(58) Field of Classification Search
CPC .. H04B 7/18513; H04B 7/212; H04B 7/2125;
H04B 1/10; H04B 1/12; H04B 1/7103;
H04W 4/029; H04W 4/02; H04W 4/90;
H04W 4/42; H04W 4/025; H04W
72/0446; H04W 4/023; H04W 84/12;
H04W 84/18
See application file for complete search history.

(56) References Cited

U.S. PATENT DOCUMENTS

| | | | |
|---|---|---|---|
| 2007/0194979 A1* | 8/2007 | Hiraoka | H04B 7/2643 |
| | | | 342/357.55 |
| 2011/0075602 A1* | 3/2011 | Peach | G01S 5/0018 |
| | | | 370/326 |
| 2012/0253566 A1* | 10/2012 | Ballou | B63B 79/40 |
| | | | 701/21 |
| 2012/0263163 A1 | 10/2012 | Burzigotti et al. | |
| 2017/0299694 A1* | 10/2017 | Ito | G01S 7/4004 |

* cited by examiner

| CHANNEL | Ch1 | | Ch2 | | Ch3 | | Ch4 | | Ch5 | | Ch6 |
|---|---|---|---|---|---|---|---|---|---|---|---|
| FREQUENCY | C1 | C1s | C2 | C2s | C3 | C3s | C4 | C4s | C5 | C5s | C6 |
| NOTIFYING SIGNAL | 1 | 0 | 1 | 0 | 0 | 0 | 0 | 0 | 0 | 0 | 0 |

| CHANNEL | Ch1 | | Ch2 | | Ch3 | | Ch4 | | Ch5 | | Ch6 |
|---|---|---|---|---|---|---|---|---|---|---|---|
| FREQUENCY | C1 | C1s | C2 | C2s | C3 | C3s | C4 | C4s | C5 | C5s | C6 |
| NOTIFYING SIGNAL | 1 | 1 | 1 | 0 | 0 | 0 | 0 | 0 | 0 | 0 | 0 |

| CHANNEL | Ch1 | | Ch2 | | Ch3 | | Ch4 | | Ch5 | | Ch6 |
|---|---|---|---|---|---|---|---|---|---|---|---|
| FREQUENCY | C1 | C1s | C2 | C2s | C3 | C3s | C4 | C4s | C5 | C5s | C6 |
| NOTIFYING SIGNAL | 1 | 1 | 1 | 1 | 1 | 1 | 1 | 0 | 1 | 0 | 1 |

| CHANNEL | Ch1 | | Ch2 | | Ch3 | | Ch4 | | Ch5 | | Ch6 |
|---|---|---|---|---|---|---|---|---|---|---|---|
| FREQUENCY | C1 | C1s | C2 | C2s | C3 | C3s | C4 | C4s | C5 | C5s | C6 |
| NOTIFYING SIGNAL | 1 | 1 | 1 | 1 | 1 | 1 | 1 | 0 | 1 | 1 | 1 |

START

S11

START RECEPTION OF
RADIO SIGNAL

S12

START GENERATION OF RECEPTION
DATA D1-D6 AND D1s-D5s

S13

NO ← DETECTION
TIMING?

YES

S14

GENERATE FREQUENCY SPECTRA
SP1-SP6 AND SP1s-SP5s

S15

COMPARE SIGNAL STRENGTHS AT
CENTER FREQUENCY C AND
BOUNDARY FREQUENCY Cs
WITH THRESHOLD TH1

S16

DETERMINE RECEPTION DATA
TO BE DEMODULATED

S17

START DEMODULATION OF
DETERMINED RECEPTION DATA

SHIP INFORMATION EXCHANGE DEVICE, SHIP INFORMATION EXCHANGE METHOD AND SHIP INFORMATION EXCHANGE PROGRAM

CROSS-REFERENCE TO RELATED APPLICATION(S)

This application claims priority under 35 U.S.C § 119 to Japanese Patent Application No. 2022-058446, which was filed on Mar. 31, 2022, the entire disclosure of which is hereby incorporated by reference.

TECHNICAL FIELD

The present disclosure relates to a ship information exchange device, a ship information exchange method, and a ship information exchange program.

BACKGROUND ART

Conventionally, a technique for transmitting and receiving ship information, such as ship identification codes between ships is known. The ship information is transmitted and received through a channel of a given frequency band, and is demodulated in a receiving device.

However, the conventional technique may increase the demodulation processing load of the device which received the ship information, and may cause data loss due to the demodulation not performed in time.

SUMMARY OF THE DISCLOSURE

The present disclosure is made in order to solve the above-described problem, and one purpose thereof is to provide a ship information exchange device, a ship information exchange method, and a ship information exchange program, which are capable of reducing the demodulation processing load.

(1) In order to solve the above-described problem, a ship information exchange device according to one aspect of the present disclosure includes a receiver, a generator, a detector, and a demodulator. The receiver receives a radio signal. The generator generates reception data of a plurality of channels used for transmission of ship information based on the radio signal. The detector detects a reception level of each of the channels. The demodulator demodulates the reception data. The demodulator determines the reception data to be demodulated according to the detection result of the reception levels.

The configuration in which the reception data to be demodulated is determined according to the reception levels of the plurality of channels is capable of selectively demodulating the reception data including the ship information, compared with the configuration in which the reception data included in the radio signals of all channels are demodulated sequentially and repeatedly in a time-divided fashion regardless of whether the ship information is included in the radio signals. Thus, it is capable of suppressing the increase in the processing load when demodulating the reception data which does not include the ship information, thereby accelerating the responses of various processings in the demodulator. Therefore, it is capable of reducing the demodulation processing load and reducing the processing cost and product cost for the demodulation.

(2) The demodulator may determine the number of channels used for the transmission of the ship information based on the detection result, and determine the reception data to be demodulated based on the determination result.

(3) The detector may further detect a reception level at a frequency of a boundary between adjacent channels.

(4) When the reception level of a first channel is a given value or more, and the reception level at a frequency of a boundary between the first channel and a second channel adjacent to the first channel is below the given value, the demodulator may demodulate the reception data of the first channel.

(5) When the reception levels of the first channel and the second channel that are channels of successive frequency bands are the given value or more, and the reception level at the frequency of the boundary between the first channel and the second channel is below the given value, the demodulator may demodulate the reception data of the first channel and the reception data of the second channel.

(6) When the reception levels of the first channel and the second channel that are channels of successive frequency bands are the given value or more, and the reception level at the frequency of the boundary between the first channel and the second channel is the given value or more, the demodulator may demodulate synthesized data obtained by synthesizing the reception data of the first channel and the reception data of the second channel.

(7) When each of the reception levels of channels of a plurality of successive frequency bands is the given value or more, and the reception level at the frequency of each of the boundaries between the adjacent channels is the given value or more, the demodulator may demodulate synthesized data obtained by synthesizing the reception data of the channels of the plurality of successive frequency bands.

(8) The demodulator may determine the reception data to be demodulated based on a comparison result of the reception level of the channel with a first threshold, and a comparison result of the reception level at the frequency of the boundary with a second threshold different from the first threshold.

(9) The ship information may include at least any one of an identification code, a name, a position, a course, a velocity, and a destination of the ship.

(10) In order to solve the above-described problem, a ship information exchange method according to one aspect of the present disclosure is a ship information exchange method in a ship information exchange device, and includes receiving a radio signal, generating reception data of a plurality of channels used for transmission of ship information based on the radio signal, detecting a reception level of each of the channels, determining the reception data to be demodulated according to the detection result of the reception levels, and demodulating the determined reception data to be demodulated.

(11) In order to solve the above-described problem, according to one aspect of the present disclosure, a non-transitory computer-readable recording medium storing a program causing a processor of a device to execute processing is provided, in which the processor controls operation of the device, and the processing includes receiving a radio signal, generating reception data of a plurality of channels used for transmission of ship information based on the radio signal, detecting a reception level of each of the channels, determining the reception data to be demodulated according to the detection result of the reception levels, and demodulating the determined reception data to be demodulated.

Effect(s) of the Disclosure

According to the present disclosure, it is possible to reduce the demodulation processing load.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION OF THE DISCLOSURE

Figure 1:
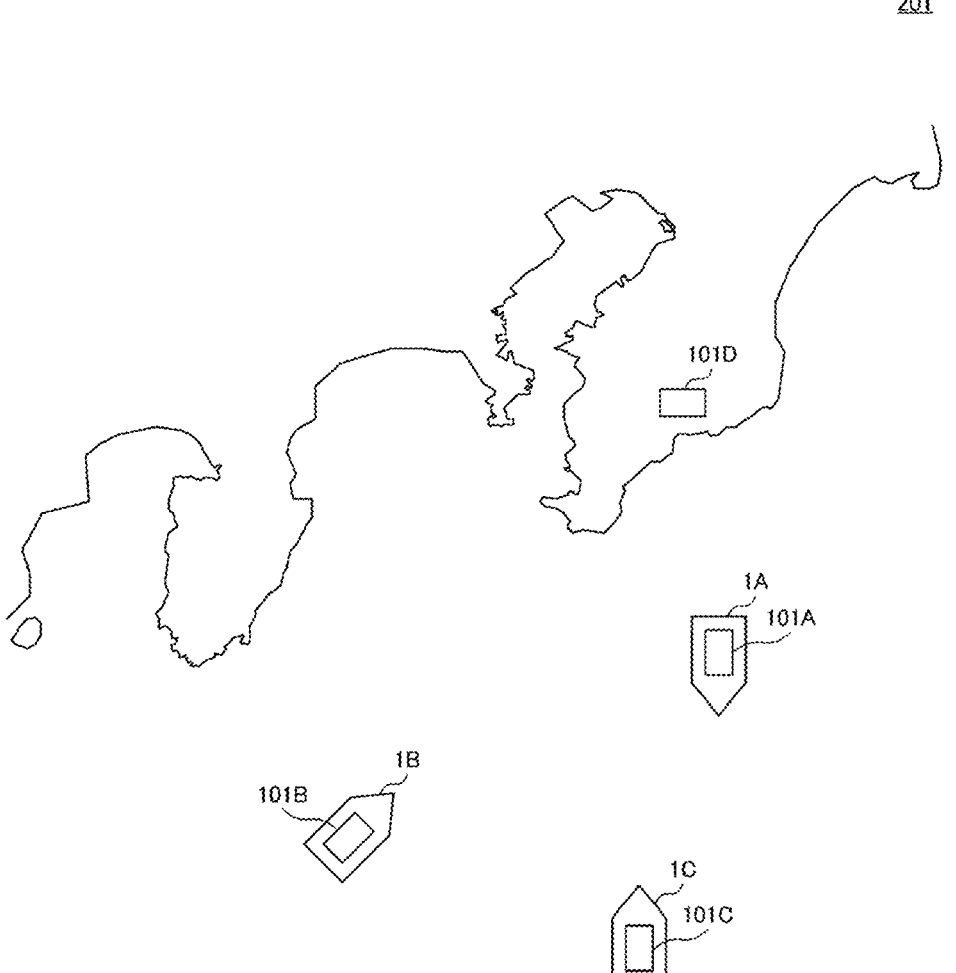
FIG. 1 is a view illustrating a configuration of a ship information exchange system according to one embodiment of the present disclosure.

Hereinafter, one embodiment of the present disclosure is described with reference to the accompanying drawings. Note that the same reference characters are assigned to the same or corresponding parts throughout the drawings not to repeat the same explanations. Further, at least parts of the following embodiment may be combined arbitrarily.

[Configuration and Basic Operation]

<Ship Information Exchange System>

FIG. 1 is a view illustrating a configuration of a ship information exchange system according to one embodiment of the present disclosure. Referring to FIG. 1, a ship information exchange system 201 may be provided with a plurality of ship information exchange devices 101. FIG. 1 representatively illustrates ship information exchange devices 101A, 101B, 101C, and 101D which are ship information exchange devices 101. The ship information exchange system 201 may be comprised of two, three, or five or more ship information exchange devices 101.

The ship information exchange devices 101 may be provided to a ship 1 or a land station. For example, the ship information exchange device 101A may be provided to a ship 1A, the ship information exchange device 101B may be provided to a ship 1B, the ship information exchange device 101C may be provided to a ship 1C, and the ship information exchange device 101D may be provided to a land station. The ship information exchange device 101 may be an AIS (Automatic Identification System), for example.

The ship information exchange device 101 provided to the ship 1 may periodically or irregularly transmit a radio signal including ship information on this ship 1 to other ship information exchange devices 101. For example, the ship information may include at least any one of an identification code, a name, a position, a course, a velocity, and a destination of the ship.

In detail, the ship information exchange devices 101A, 101B, and 101C may generate modulated data by modulating communication data including the ship information, for example, according to BPSK (Binary Phase Shift Keying), and transmit a radio signal including the generated modulated data. Note that the ship information exchange devices 101A, 101B, and 101C may use other modulating methods, such as QPSK (Quadrature PSK), 8PSK, and 16QAM (Quadrature Amplitude Modulation), instead of BPSK.

The ship information exchange device 101 may receive the radio signal from another ship information exchange device 101 provided to the ship 1, and acquire the modulated data from the received radio signal. The ship information exchange device 101 may generate communication data by demodulating the acquired modulated data, and acquire the ship information from the generated communication data. The ship information exchange device 101 may notify a user of information, for example, on the identification code of the ship 1 which is indicated by the acquired ship information.

The ship information exchange device 101 may transmit and receive the radio signal through a plurality of channels which are given frequency bands. For example, the ship information exchange device 101 may transmit and receive the radio signal through six channels (channels CH1-CH6).

For example, the ship information exchange devices 101A, 101B, and 101C may transmit the radio signal through the channels CH1, CH2, and CH3 among the six channels, respectively.

In this case, the ship information exchange devices 101B, 101C, and 101D may receive the radio signal of the channel CH1 transmitted from the ship information exchange device 101A. The ship information exchange devices 101A, 101C, and 101D may receive the radio signal of the channel CH2 transmitted from the ship information exchange device 101B. The ship information exchange devices 101A, 101B, and 101D may receive the radio signal of the channel CH3 transmitted from the ship information exchange device 101C.

Problem

For example, when a distance between the ship information exchange device 101 and another ship information exchange device 101 which is mounted on another ship 1 other than the ships 1A, 1B, and 1C becomes below a given value, the ship information exchange device 101 may further receive the radio signal transmitted from this another ship information exchange device 101. The ship information exchange device 101 may change the channel through which the radio signal is transmitted.

Further, in the ship information exchange system 201, the ship information exchange devices 101 may perform wireless communications in a random access method. That is, the transmission order of the radio signals of the ship information exchange devices 101 provided to the ships 1 may not be defined beforehand, but each ship information exchange device 101 may transmit the radio signal at an individual transmission timing.

Therefore, a conventional ship information exchange device 101 needs to repeatedly perform the demodulation of the six reception data included in the respective radio signals of the six channels sequentially in time-divided fashion, regardless of whether the ship information is included in the received radio signal.

Further, the ship information exchange device 101 may transmit the radio signal through a synthesized channel which is obtained by synthesizing a plurality of channels of successive frequency bands, according to the contents of the ship information to be transmitted.

Therefore, in addition to the demodulation of the six reception data included in the respective radio signals of the six channels, the conventional ship information exchange device 101 needs to further perform, for each combination of the plurality of channels of the successive frequency bands, demodulation of the reception data included in the corresponding radio signal.

Therefore, the conventional ship information exchange device 101 may cause data loss because of the increased demodulation processing load and the too-slow demodulation.

The ship information exchange device 101 according to this embodiment solves the above-described problem by the following configurations.

<Ship Information Exchange Device>

Figure 2:
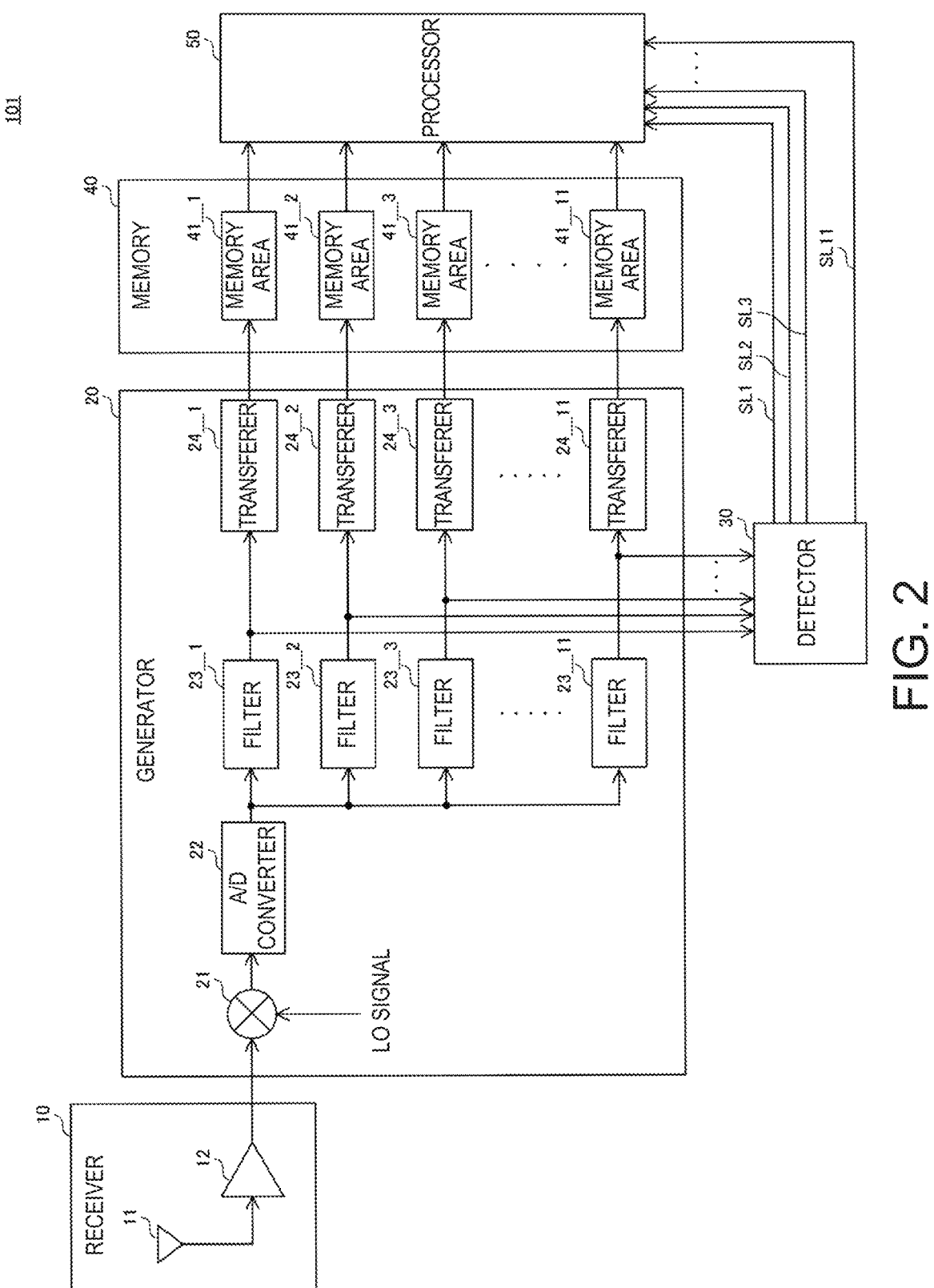
FIG. 2 is a view illustrating a configuration of a ship information exchange device according to the embodiment of the present disclosure.

FIG. 2 is a view illustrating a configuration of the ship information exchange device according to this embodiment. Referring to FIG. 2, the ship information exchange device 101 may include a receiver 10, a generator 20, a detector 30, a memory 40, and a processor 50. The processor 50 is one example of a demodulator. For example, the detector 30 may be connected with the processor 50 via 11 signal wires SL1-SL11. Below, each of the signal wires SL1-SL11 may also be referred to as a signal wire SL.

A part or all of the generator 20 may be realized by an FPGA (Field-Programmable Gate Array). A part or all of the detector 30 and the processor 50 may be realized by processor(s), such as a CPU (Central Processing Unit) and a DSP (Digital Signal Processor). The memory 40 may be a RAM (Random Access Memory), which may include memory areas 41_1 to 41_11.

The receiver 10 may include an antenna 11 and an amplifier 12.

The generator 20 may include a mixer 21, an AD (Analog to Digital) converter 22, filters 23_1 to 23_11, and transferers 24_1 to 24_11. Below, each of the filters 23_1 to 23_11 may also be referred to as a filter 23, and each of the transferers 24_1 to 24_11 may also be referred to as a transferer 24. The transferer 24 may be realized by a DMA (Direct Memory Access).

(Receiver)

The receiver 10 may receive the radio signal. In detail, the amplifier 12 may amplify the radio signals of the channels CH1-CH6 received via the antenna 11, and output them to the generator 20.

(Generator)

The generator 20 may generate the reception data of the channels CH1-CH6 used for the transmission of the ship information based on the radio signals.

In detail, the mixer 21 may convert each of the radio signals received from the amplifier 12 into an analog signal of a baseband using an LO (Local Oscillator) signal received from a local oscillator (not illustrated), and output the converted analog signal to the A/D converter 22.

The A/D converter 22 may output to the filter 23 a digital signal which is obtained by converting the analog signal received from the mixer 21 into the digital signal.

The filter 23 may be a BPF (Band Pass Filter), which may attenuate a component outside a given frequency band among frequency components of a signal indicated by the digital signal received from the A/D converter 22.

For example, the filters 23_1, 23_3, 23_5, 23_7, 23_9, and 23_11 may attenuate components outside the frequency band corresponding to the channels CH1-CH6, respectively, among the frequency components of the signal indicated by the digital signal received from the A/D converter 22.

In detail, the filter 23_1 may attenuate a component outside a frequency band F1 corresponding to the channel CH1 among the frequency components of the signal indicated by the digital signal received from the A/D converter 22. The filter 23_3 may attenuate a component outside a frequency band F2 corresponding to the channel CH2 among the frequency components of the signal indicated by the digital signal received from the A/D converter 22. The filter 23_5 may attenuate a component outside a frequency band F3 corresponding to the channel CH3 among the frequency components of the signal indicated by the digital signal received from the A/D converter 22. The filter 23_7 may attenuate a component outside a frequency band F4 corresponding to the channel CH4 among the frequency components of the signal indicated by the digital signal received from the A/D converter 22. The filter 23_9 may attenuate a component outside a frequency band F5 corresponding to the channel CH5 among the frequency components of the signal indicated by the digital signal received from the A/D converter 22. The filter 23_11 may attenuate a component outside a frequency band F6 corresponding to the channel CH6 among the frequency components of the signal indicated by the digital signal received from the A/D converter 22.

Moreover, for example, the filters 23_2, 23_4, 23_6, 23_8, and 23_10 may attenuate the components outside the frequency band including frequencies of boundaries of the corresponding adjacent channels among the frequency components of the signal indicated by the digital signal received from the A/D converter 22.

In detail, the filter 23_2 may attenuate a component outside a frequency band F1s between a center frequency C1 of the frequency band F1 and a center frequency C2 of the frequency band F2 among the frequency components of the signal indicated by the digital signal received from the A/D converter 22. The filter 23_4 may attenuate a component outside a frequency band F2s between the center frequency C2 and a center frequency C3 of the frequency band F3 among the frequency components of the signal indicated by the digital signal received from the A/D converter 22. The filter 23_6 may attenuate a component outside a frequency band F3s between the center frequency C3 and a center frequency C4 of the frequency band F4 among the frequency components of the signal indicated by the digital signal received from the A/D converter 22. The filter 23_8 may attenuate a component outside a frequency band F4s between the center frequency C4 and a center frequency C5 of the frequency band F5 among the frequency components of the signal indicated by the digital signal received from the A/D converter 22. The filter 23_10 may attenuate a component outside a frequency band F5s between the center frequency C5 and a center frequency C6 of the frequency band F6 among the frequency components of the signal indicated by the digital signal received from the A/D converter 22.

The transferer 24 may store in the memory area 41 of the memory 40 the digital signal which passed the filter 23.

In detail, the transferer 24_1 may store in the memory area 41_1 reception data D1 of the channel CH1 which is a digital signal which passed the filter 23_1. The transferer 24_3 may store in the memory area 41_3 reception data D2 of the channel CH2 which is a digital signal which passed the filter 23_3. The transferer 24_5 may store in the memory area 41_5 reception data D3 of the channel CH3 which is a digital signal which passed the filter 23_5. The transferer 24_7 may store in the memory area 41_7 reception data D4 of the channel CH4 which is a digital signal which passed the filter 23_7. The transferer 24_9 may store in the memory area 41_9 reception data D5 of the channel CH5 which is a digital signal which passed the filter 23_9. The transferer 24_11 may store in the memory area 41_11 reception data D6 of the channel CH6 which is a digital signal which passed the filter 23_11.

The transferer 24_2 may store in the memory area 41_2 reception data D1s of the frequency band F1s which is a digital signal which passed the filter 23_2. The transferer 24_4 may store in the memory area 41_4 reception data D2s of the frequency band F2s which is a digital signal which passed the filter 23_4. The transferer 24_6 may store in the memory area 41_6 reception data D3s of the frequency band F3s which is a digital signal which passed the filter 23_6. The transferer 24_8 may store in the memory area 41_8 reception data D4s of the frequency band F4s which is a digital signal which passed the filter 23_8. The transferer 24_10 may store in the memory area 41_10 reception data D5s of the frequency band F5s which is a digital signal which passed the filter 23_10.

(Detector)

The detector 30 may detect reception levels of the channels CH1-CH6. For example, the detector 30 may detect further the reception level at the frequency of the boundary of the adjacent channels.

For example, the detector 30 may generate, at a detection timing according to a given detection cycle, a frequency spectrum of the digital signal by carrying out FFT (Fast Fourier Transform) processing of the digital signal which passed the filter 23 within a given length of time. The detector 30 may compare a signal strength at the given frequency indicated by the generated frequency spectrum with a given threshold TH1.

In detail, the detector 30 may generate a frequency spectrum SP1 of the digital signal by carrying out the FFT processing of the digital signal which passed the filter 23_1. The detector 30 may compare a signal strength at the center frequency C1 which is indicated by the frequency spectrum SP1 with the threshold TH1.

The detector 30 may generate a frequency spectrum SP1s of the digital signal by carrying out the FFT processing of the digital signal which passed the filter 23_2. The detector 30 may compare with the threshold TH1 a signal strength at a boundary frequency C1s which is a frequency at the boundary between the channel CH1 and the channel CH2 which is indicated by the frequency spectrum SP1s.

The detector 30 may generate a frequency spectrum SP2 of the digital signal by carrying out the FFT processing of the digital signal which passed the filter 23_3. The detector 30 may compare a signal strength at the center frequency C2 which is indicated by the frequency spectrum SP2 with the threshold TH1.

The detector 30 may generate a frequency spectrum SP2s of the digital signal by carrying out the FFT processing of the digital signal which passed the filter 23_4. The detector 30 may compare with the threshold TH1 a signal strength at a boundary frequency C2s which is a frequency at the boundary between the channel CH2 and the channel CH3, which is indicated by the frequency spectrum SP2s.

The detector 30 may generate a frequency spectrum SP3 of the digital signal by carrying out the FFT processing of the digital signal which passed the filter 23_5. The detector 30 may compare a signal strength at the center frequency C3 which is indicated by the frequency spectrum SP3 with the threshold TH1.

The detector 30 may generate a frequency spectrum SP3s of the digital signal by carrying out the FFT processing of the digital signal which passed the filter 23_6. The detector 30 may compare with the threshold TH1 a signal strength at a boundary frequency C3s which is a frequency at the boundary between the channel CH3 and the channel CH4, which is indicated by the frequency spectrum SP3s.

The detector 30 may generate a frequency spectrum SP4 of the digital signal by carrying out the FFT processing of the digital signal which passed the filter 23_7. The detector 30 may compare a signal strength at the center frequency C4 which is indicated by the frequency spectrum SP4 with the threshold TH1.

The detector 30 may generate a frequency spectrum SP4s of the digital signal by carrying out the FFT processing of the digital signal which passed the filter 23_8. The detector 30 may compare with the threshold TH1 a signal strength at a boundary frequency C4s which is a frequency at the boundary between the channel CH4 and the channel CH5, which is indicated by the frequency spectrum SP4s.

The detector 30 may generate a frequency spectrum SP5 of the digital signal by carrying out the FFT processing of the digital signal which passed the filter 23_9. The detector 30 may compare a signal strength at the center frequency C5 which is indicated by the frequency spectrum SP5 with the threshold TH1.

The detector 30 may generate a frequency spectrum SP5s of the digital signal by carrying out the FFT processing of the digital signal which passed the filter 23_10. The detector 30 may compare with the threshold TH1 a signal strength at a boundary frequency C5s which is a frequency at the boundary between the channel CH5 and the channel CH6, which is indicated by the frequency spectrum SP5s.

The detector 30 may generate a frequency spectrum SP6 of the digital signal by carrying out the FFT processing of the digital signal which passed the filter 23_11. The detector 30 may compare a signal strength at the center frequency C6 which is indicated by the frequency spectrum SP6 with the threshold TH1.

Below, each of the center frequencies C1-C6 may also be referred to as the center frequency C, and each of the boundary frequencies C1s-C5s may also be referred to as the boundary frequency Cs.

Figure 3:
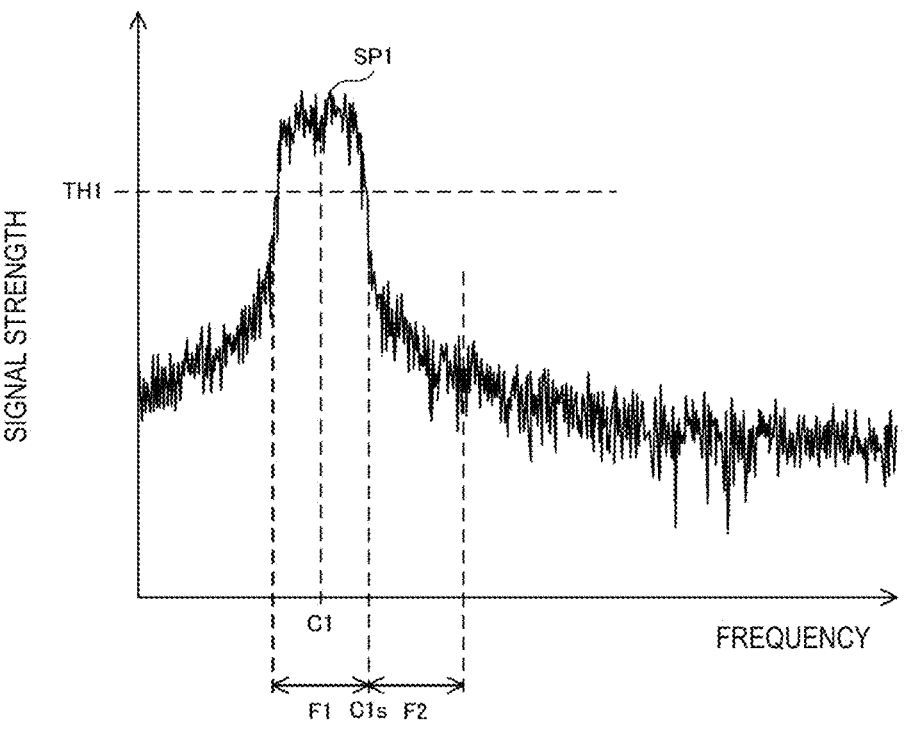
FIG. 3 is a view illustrating one example of a frequency spectrum generated by a detector in the ship information exchange device according to the embodiment of the present disclosure.

FIG. 3 is a view illustrating one example of the frequency spectrum generated by the detector in the ship information exchange device according to this embodiment. FIG. 3 illustrates the frequency spectrum SP1 of the signal which passed the filter 23_1, which is generated by the detector 30, in the ship information exchange device 101 which received the radio signal of the channel CH1 including the ship information.

Referring to FIG. 3, in the ship information exchange device 101 which received the radio signal of the channel CH1 including the ship information, the signal strength at the center frequency C1 is the threshold TH1 or more in the frequency spectrum SP1 generated by the detector 30. On the other hand, in the frequency spectrum SP1, the signal strength at the boundary frequency C1s is below the threshold TH1.

Figure 4:
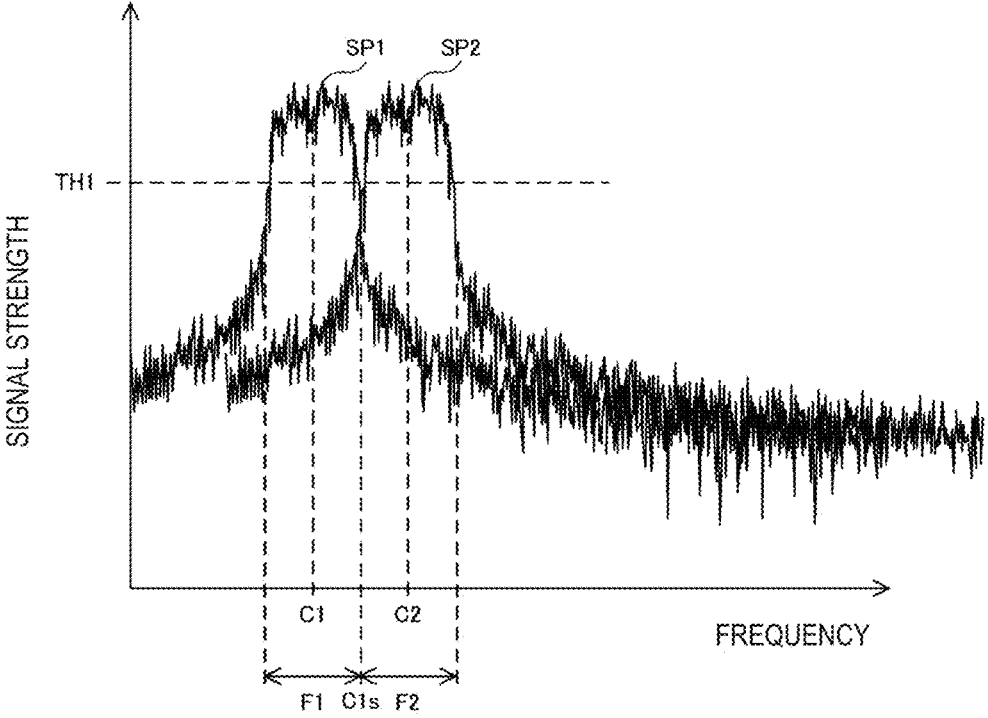
FIG. 4 is a view illustrating another example of the frequency spectrum generated by the detector in the ship information exchange device according to the embodiment of the present disclosure.

FIG. 4 is a view illustrating another example of the frequency spectrum generated by the detector in the ship information exchange device according to this embodiment. FIG. 4 further illustrates the frequency spectrum SP2 of the signal which passed the filter 23_3 which is generated by the detector 30 in the ship information exchange device 101 which further received the radio signal of the channel CH2 including the ship information in parallel, as compared with FIG. 3.

Referring to FIG. 4, in the ship information exchange device 101 which further received the radio signal of the channel CH2 including the ship information in parallel, the signal strength at the center frequency C2 is the threshold TH1 or more in the frequency spectrum SP2 generated by the detector 30. On the other hand, in the frequency spectrum SP2, the signal strength at the boundary frequency C1s is below the threshold TH1.

Figures 5, 6:
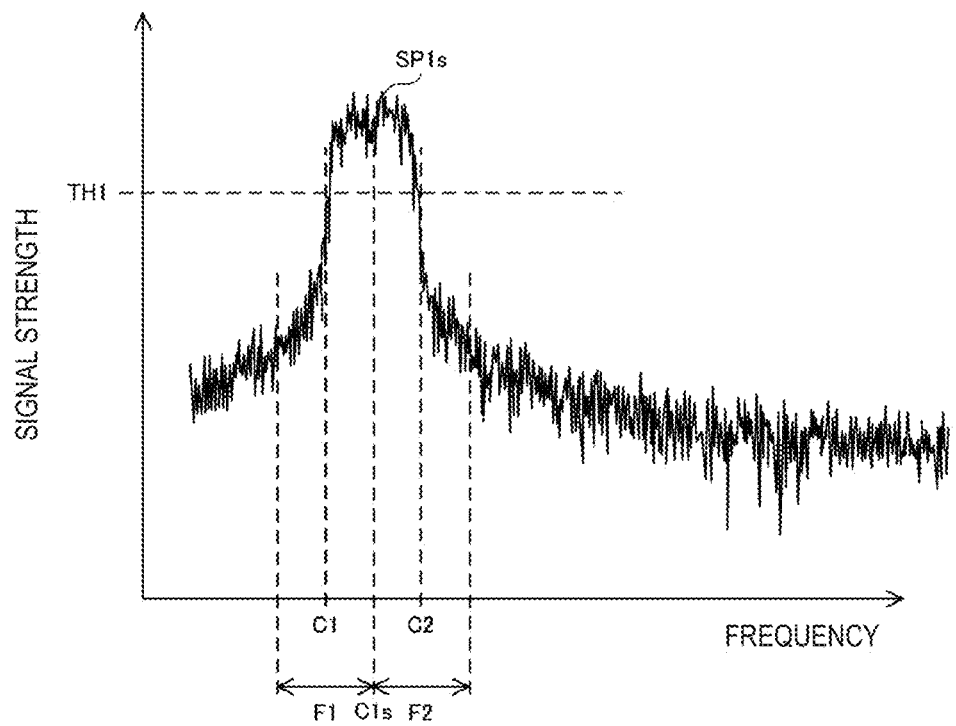
FIG. 5 is a view illustrating still another example of the frequency spectrum generated by the detector in the ship information exchange device according to the embodiment of the present disclosure.
FIG. 6 is a view illustrating one example of a comparison result which is notified to a processor by the detector in the ship information exchange device according to the embodiment of the present disclosure.

FIG. 5 is a view illustrating another example of the frequency spectrum generated by the detector in the ship information exchange device according to this embodiment. FIG. 5 illustrates the frequency spectrum SP1s of the signal passed through the filter 23_2 which was generated by the detector 30 in the ship information exchange device 101 which received the radio signal, including the ship information, of a synthesized channel CH12 obtained by synthesizing the channels CH1 and CH2.

Referring to FIG. 5, in the ship information exchange device 101 which received the radio signal of the synthesized channel CH12 including the ship information, the signal strength at the boundary frequency C1s is the threshold TH1 or more in the frequency spectrum SP1s generated by the detector 30.

The detector 30 may notify the processor 50 of a comparison result of the signal strengths of the center frequency C and the boundary frequency Cs with the threshold TH1. As one example, the detector 30 may notify the processor 50 of the comparison result via the signal wire SL by setting a level of a notifying signal which is a signal to be outputted to the signal wire SL according to the comparison result of the signal strengths of the center frequency C and the boundary frequency Cs with the threshold TH1.

In detail, when the signal strength of the center frequency C is the threshold TH1 or more, the detector 30 may set the notifying signal to be outputted to the corresponding signal wire SL as HIGH level, and, on the other hand, when the signal strength of the center frequency C is below the threshold TH1, it may set the notifying signal to be outputted to the corresponding signal wire SL as LOW level.

When the signal strength of the boundary frequency Cs is the threshold TH1 or more, the detector 30 may set the notifying signal to be outputted to the corresponding signal wire SL as HIGH level, and, on the other hand, when the signal strength of the boundary frequency Cs is below the threshold TH1, it may set the notifying signal to be outputted to the corresponding signal wire SL as LOW level.

FIG. 6 is a view illustrating one example of the comparison result which is notified to the processor by the detector in the ship information exchange device according to this embodiment. FIG. 6 illustrates the notifying signal to be outputted to the signal wire SL by the detector 30 in the ship information exchange device 101 which received a radio signal RS1 of the channel CH1 including the ship information. In FIG. 6, a HIGH-level notifying signal is illustrated as "1," and a LOW-level notifying signal is illustrated as "0." Similar illustration is applied in FIG. 7 and subsequent drawings.

Referring to FIG. 6, in the frequency spectrum SP1 generated by the detector 30 of the ship information exchange device 101 which received the radio signal RS1, the signal strength at the center frequency C1 becomes the threshold TH1 or more, while in the frequency spectra SP2-SP6 and the frequency spectra SP1s-SP5s, the signal strengths at the center frequencies C2-C6 and the boundary frequencies C1s-C5s become below the threshold TH1.

In this case, for example, the detector 30 may set the notifying signal to be outputted to the signal wire SL1 as HIGH level, and set the notifying signals to be outputted to the signal wires SL2-SL11 as LOW level.

Figures 7, 8:
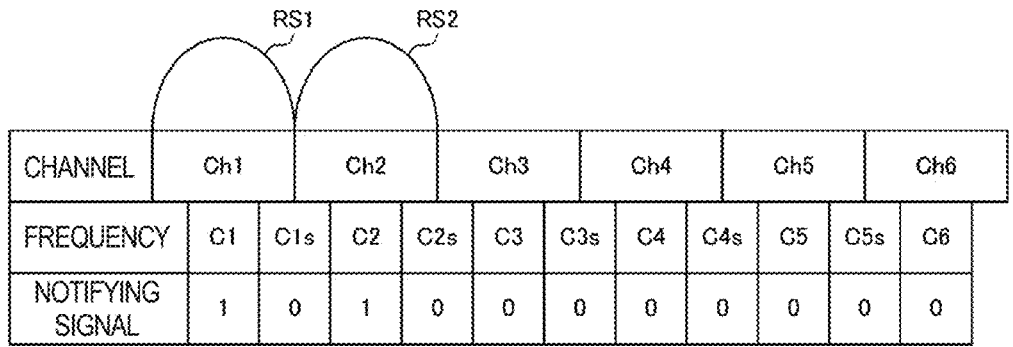
FIG. 7 is a view illustrating another example of the comparison result which is notified to the processor by the detector in the ship information exchange device according to the embodiment of the present disclosure.
FIG. 8 is a view illustrating still another example of the comparison result which is notified to the processor by the detector in the ship information exchange device according to the embodiment of the present disclosure.

FIG. 7 is a view illustrating another example of the comparison result which is notified to the processor by the detector in the ship information exchange device according to this embodiment. FIG. 7 illustrates the notifying signal to be outputted to the signal wire SL by the detector 30 in the ship information exchange device 101 which received the radio signal RS1 of the channel CH1 including the ship information and a radio signal RS2 of the channel CH2 including the ship information.

Referring to FIG. 7, in the frequency spectra SP1 and SP2 generated by the detector 30 in the ship information exchange device 101 which received the radio signals RS1 and RS2, the signal strengths at the center frequencies C1 and C2 become the threshold TH1 or more, while on the other hand, in the frequency spectra SP3-SP6 and the frequency spectra SP1s-SP5s, the signal strength at the center frequencies C3-C6 and the boundary frequencies C1s-C5s become below the threshold TH1.

In this case, for example, the detector 30 may set the notifying signals to be outputted to the signal wires SL1 and SL2 as HIGH level, and set the notifying signals to be outputted to the signal wires SL2 and SL4-SL11 as LOW level.

FIG. 8 is a view illustrating another example of the comparison result which is notified to the processor by the detector in the ship information exchange device according to this embodiment. FIG. 8 illustrates the notifying signal to be outputted to the signal wire SL by the detector 30 in the ship information exchange device 101 which received a radio signal RS12 of the synthesized channel CH12 of the channels CH1 and CH2 including the ship information.

Referring to FIG. 8, in the frequency spectra SP1, SP2, and SP1s generated by the detector 30 in the ship information exchange device 101 which received the radio signal RS12, the signal strengths at the center frequencies C1 and C2, and the boundary frequency C1s become the threshold TH1 or more, while in the frequency spectra SP3-SP6 and frequency spectra SP2s-SP5s, the signal strengths at the center frequencies C3-C6 and the boundary frequencies C2s-C5s become below the threshold TH1.

In this case, for example, the detector 30 may set the notifying signal to be outputted to the signal wires SL1-SL3 as HIGH level, and set the notifying signal to be outputted to the signal wires SL4-SL11 as LOW level.

Figures 9, 10:
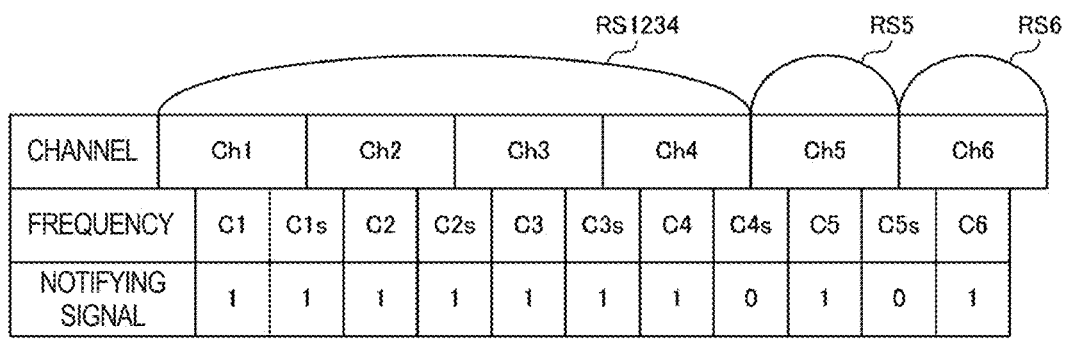
FIG. 9 is a view illustrating still another example of the comparison result which is notified to the processor by the detector in the ship information exchange device according to the embodiment of the present disclosure.
FIG. 10 is a view illustrating still another example of the comparison result which is notified to the processor by the detector in the ship information exchange device according to the embodiment of the present disclosure.

FIG. 9 is a view illustrating another example of the comparison result which is notified to the processor by the detector in the ship information exchange device according to this embodiment. FIG. 9 illustrates the notifying signals to be outputted to the signal wires SL1-SL11 by the detector 30 in the ship information exchange device 101 which received a radio signal RS1234 of a synthesized channel CH1234 of the channels CH1-CH4 including the ship information, a radio signal RS5 of the channel CH5 including the ship information, and a radio signal RS6 of the channel CH6 including the ship information.

Referring to FIG. 9, in the frequency spectra SP1-SP6 and SP1s-SP3s which are generated by the detector 30 of the ship information exchange device 101 which received the radio signals RS1234, RS5, and RS6, the signal strengths at the center frequencies C1-C6 and the boundary frequencies C1s-C3s become the threshold TH1 or more, while in the frequency spectra SP4s and SP5s, the signal strengths at the boundary frequencies C4s and C5s become below the threshold TH1.

In this case, for example, the detector 30 may set the notifying signal to be outputted to the signal wires SL1-SL7, SL9, and SL11 as HIGH level, and set the notifying signal to be outputted to the signal wires SL8 and SL10 as LOW level.

FIG. 10 is a view illustrating another example of the comparison result which is notified to the processor by the detector in the ship information exchange device according to this embodiment. FIG. 10 illustrates the notifying signals to be outputted to the signal wires SL1-SL11 by the detector 30 in the ship information exchange device 101 which received the radio signal RS1234 of the synthesized channel CH1234 of the channels CH1-CH4 including the ship information, and a radio signal RS56 of a synthesized channel CH56 of the channels CH5 and CH6 including the ship information.

Referring to FIG. 10, in the frequency spectra SP1-SP6, SP1s-SP3s, and SP5s generated by the detector 30 of the ship information exchange device 101 which received the radio signals RS1234 and RS56, the signal strengths at the center frequencies C1-C6 and the boundary frequencies C1s-C3s, and C5s become the threshold TH1 or more, while in the frequency spectrum SP4s, the signal strength at the boundary frequency C4s becomes below the threshold TH1.

In this case, the detector 30 may set the notifying signals to be outputted to the signal wires SL1-SL7, SL9-SL11 as HIGH level, and set the notifying signal to be outputted to the signal wire SL8 as LOW level.

Note that the detector 30 may compare the signal strength at the center frequency C with the threshold TH1, may compare the signal strength at the boundary frequency Cs with a threshold TH2 which is different from the threshold TH1, and may notify the processor 50 of the comparison result.

Further, the detector 30 may use a value other than the threshold TH1 as the threshold used for the comparison of the signal strength at least at any one of the center frequencies C, or may use a value other than the threshold TH1 as the threshold used for the comparison of the signal strength at least at any one of the boundary frequencies Cs.

(Processor)

The processor 50 may determine the reception data to be demodulated according to the detection result of the reception levels by the detector 30, and demodulate the determined reception data. In detail, the processor 50 may determine the reception data to be demodulated according to the comparison result notified from the detector 30 (i.e., the level of the notifying signal received from the detector 30 via the signal wire SL), acquire the determined reception data from the memory 40, and demodulate it.

For example, the processor 50 may determine the number of channels used for the transmission of the ship information based on the detection result of the reception level by the detector 30, and determine the reception data to be demodulated based on the determination result.

For example, when the reception level at the center frequency C1 of the channel CH1 is a given value or more and the reception level at the boundary frequency C1s is below the given value, the processor 50 may demodulate the reception data D1 of the channel CH1.

In detail, in a state where the processor 50 receives the notifying signals illustrated in FIG. 6 from the detector 30, the processor 50 may determine that the channel used for the transmission of the ship information is the channel CH1. In this case, each time the reception data D1 is stored in the memory area 41_1 by the transferer 24_1, the processor 50 may extract the reception data D1 from the memory area 41_1, and demodulate it. On the other hand, in the state where the processor 50 receives the notifying signals illustrated in FIG. 6 from the detector 30, the processor 50 may eliminate the reception data stored by the transferers 24_2 to 24_11 in the memory areas 41_2 to 41_11 without demodulating the reception data.

For example, the reception level at the center frequency C1 of the channel CH1 and the reception level at the center frequency C2 of the channel CH2, which are channels of successive frequency bands, are the given value or more, and when the reception level at the boundary frequency C1s is below the given value, the processor 50 may demodulate the reception data D1 of the channel CH1 and the reception data D2 of the channel CH2, respectively.

In detail, the processor 50 may determine that the channels used for the transmission of the ship information in a state where the processor 50 receives the notifying signals illustrated in FIG. 7 from the detector 30 are the channels CH1 and CH2. In this case, each time the reception data D1 is stored in the memory area 41_1 by the transferer 24_1, the processor 50 may extract the reception data D1 from the memory area 41_1 and demodulate it, and each time the reception data D2 is stored in the memory area 41_3 by the transferer 24_3, the processor 50 may extract the reception data D2 from the memory area 41_3 and demodulate it. On the other hand, in the state where the processor 50 receives the notifying signals illustrated in FIG. 7 from the detector 30, the processor 50 may eliminate the reception data stored by the transferers 24_2 and 24_4 to 24_11 in the memory areas 41_2 and 41_4 to 41_11, without demodulating the reception data.

For example, when the reception level at the center frequency of each of the channels of a plurality of successive frequency bands is the given value or more, and the reception level at the frequency of the boundary between adjacent channels of the plurality of successive frequency bands is the given value or more, the processor 50 may demodulate the synthesized data which is obtained by synthesizing the reception data of the channels of the plurality of successive frequency bands.

For example, when the reception level at the center frequency C1 of the channel CH1 and the reception level at the center frequency C2 of the channel CH2 which are of the successive frequency bands are the given value or more, and when the reception level at the boundary frequency C1s is the given value or more, the processor 50 may demodulate the synthesized data which is obtained by synthesizing the reception data D1 and D2 of the channels CH1 and CH2.

In detail, in a state where the processor 50 receives the notifying signals illustrated in FIG. 8 from the detector 30, the processor 50 may determine that the channel used for the transmission of the ship information is the synthesized channel CH12 of the channels CH1 and CH2. In this case, each time the reception data D1 and D2 are stored in the memory areas 41_1 and 41_3 by the transferers 24_1 and 24_3, the processor 50 may generate the synthesized data D12 by extracting the reception data D1 and D2 from the memory areas 41_1 and 41_3 and synthesizing the reception data D1 and D2, and demodulate the generated synthesized data D12. On the other hand, in the state where the processor 50 receives the notifying signals illustrated in FIG. 8 from the detector 30, the processor 50 may eliminate the reception data stored in the memory areas 41_4 to 41_11 by the transferers 24_4 to 24_11 without demodulating the reception data. Note that the processor 50 may generate the synthesized data D12 by extracting the reception data D1, D1s, and D2 from the memory areas 41_1 to 41_3 and synthesizing the reception data.

[Flow of Operation]

Each device in the ship information exchange system according to this embodiment may be provided with a computer including a memory, and an arithmetic processor, such as a CPU, in the computer, may read a program including a part or all of each step of the following flowchart from the memory, and execute the program. The programs of these devices may be installable from external device(s). These programs may be circulated in the state stored in a recording medium, or via a communication line or network.

Figure 11:
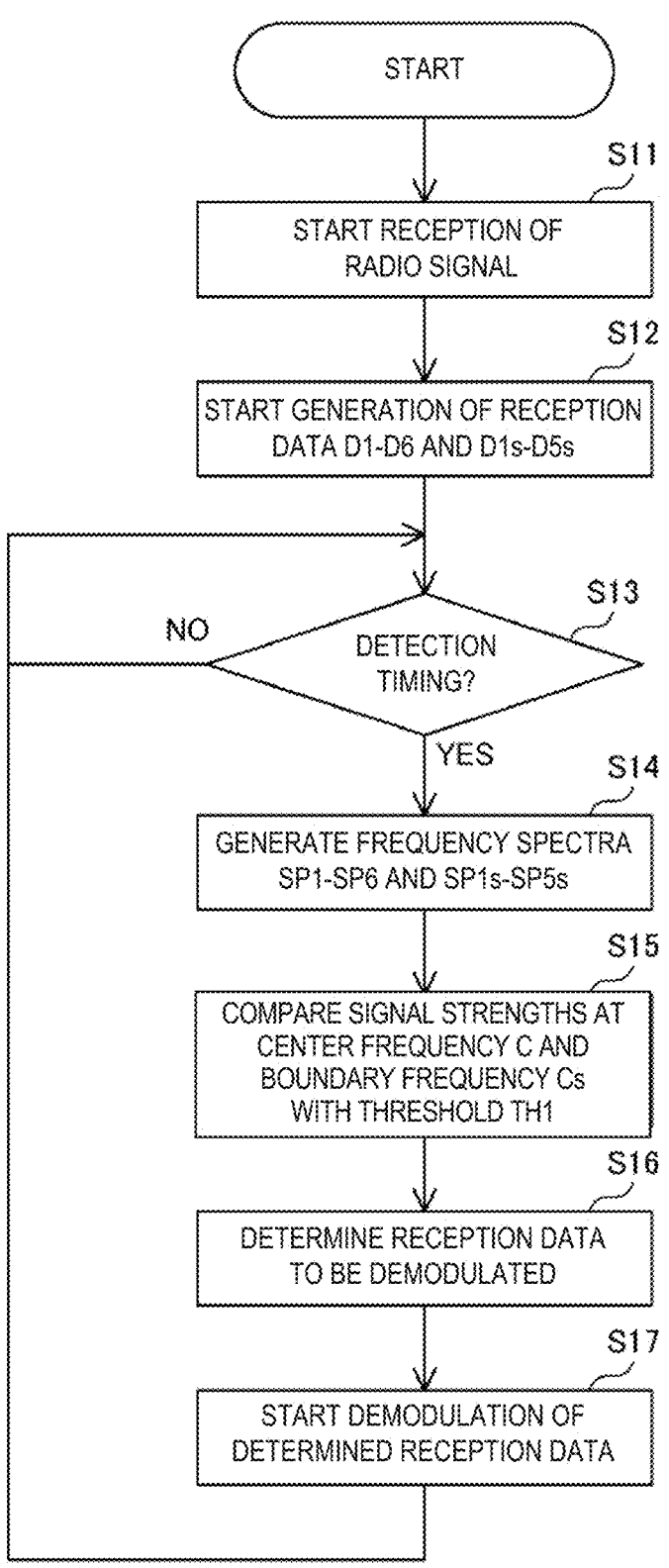
FIG. 11 is a flowchart illustrating one example of operation when the ship information exchange device according to the embodiment of the present disclosure demodulates reception data.

FIG. 11 is a flowchart illustrating one example of operation when the ship information exchange device according to this embodiment demodulates the reception data.

Referring to FIG. 11, the ship information exchange device 101 may first start the reception of the radio signal (Step S11).

Next, the ship information exchange device 101 may start generation of the reception data D1-D6 of the channels CH1-CH6 and the reception data D1s-D5s of the frequency bands F1s-F5s, and storing of the reception data in the memory 40 (Step S12).

Next, the ship information exchange device 101 may await the detection timing according to the given detection cycle (NO at Step S13), and if the detection timing is reached (YES at Step S13), the ship information exchange device 101 may generate the frequency spectra SP1-SP6 and SP1s-SP5s by carrying out the FFT processing of the digital signal which passed the filter 23 (Step S14).

Next, the ship information exchange device 101 may detect the reception levels of the channels CH1-CH6 and the reception levels in the boundary frequencies C1s-C5s using the generated frequency spectra SP1-SP6 and SP1s-SP5s. In detail, the ship information exchange device 101 may compare the signal strength at the center frequency C and the signal strength at the boundary frequency Cs with the threshold TH1 (Step S15).

Next, the ship information exchange device 101 may determine the number of channels used for the transmission of the ship information based on the comparison result, and then determine the reception data to be demodulated based on the determination result (Step S16).

Next, the ship information exchange device 101 may start the demodulation of the determined reception data. In detail, each time the ship information exchange device 101 generates the reception data D1-D6 and D1s-D5s, it may extract the reception data to be demodulated among the generated reception data D1-D6 and D1s-D5s from the memory 40 and demodulate the reception data, and eliminate the reception data which is not the candidate to be demodulated from the memory 40 (Step S17).

Next, the ship information exchange device 101 may await a new detection timing (NO at Step S13).

Note that, although in the ship information exchange device 101 according to this embodiment the detector 30 compares with the threshold TH1 the signal strengths at the center frequencies C1-C6 and the boundary frequencies C1s-C5s indicated by the frequency spectra SP1-SP6 and SP1s-SP5s of the digital signal which passed the filter 23, and notifies the processor 50 of the comparison result, the present disclosure is not limited to this configuration. The detector 30 may perform the detection in the analog stage. In detail, a plurality of sets of analog BPFs and A/D converters may be provided after the mixer 21, and the detector 30 may compare with the threshold TH1 the signal strengths of the center frequency C and the boundary frequency Cs of the analog signal which passed each analog BPF, and notify the processor 50 of the comparison result.

Further, although in the ship information exchange device 101 according to this embodiment the generator 20 includes the transferers 24_2, 24_4, 24_6, 24_8, and 24_10, the present disclosure is not limited to this configuration. The generator 20 may include the transferers 24_1, 24_3, 24_5, 24_7, 24_9, and 24_11, and may not include the transferers 24_2, 24_4, 24_6, 24_8, and 24_10. In this case, the generator 20 may generate the synthesized data without using the reception data D1s-D5s.

Meanwhile, technologies to reduce the demodulation processing load are desired.

In this regard, in the ship information exchange device 101 according to this embodiment, the receiver 10 may receive the radio signal. The generator 20 may generate the reception data of the channels CH1-CH6 used for the transmission of the ship information based on the radio signal. The detector 30 may detect the reception levels of the channels CH1-CH6. The processor 50 may demodulate the reception data. The processor 50 may determine the reception data to be demodulated according to the detection result of the reception levels.

The configuration in which the reception data to be demodulated is determined according to the reception levels of the channels CH1-CH6 is capable of selectively demodulating the reception data including the ship information, compared with the configuration in which the six reception data included in the radio signals of the channels CH1-CH6 are demodulated sequentially and repeatedly in a time-divided fashion regardless of whether the ship information is included in the radio signals. Thus, it is capable of suppressing the increase in the processing load when demodulating the reception data which does not include the ship information, thereby accelerating the responses of various processings in the processor 50. Therefore, it is capable of reducing the demodulation processing load and reducing the processing cost and product cost for the demodulation.

Further, the processor 50 may determine the number of channels used for the transmission of the ship information based on the detection result, and determine the reception data to be demodulated based on the determination result.

Such a configuration is capable of appropriately demodu-
lating the reception data of the synthesized channel in the
system in which the radio signals are transmitted and
received using the synthesized channel which is obtained by
synthesizing a plurality of channels.

Further, the detector 30 may detect the reception level at
the frequency of the boundary of the adjacent channels.

Such a configuration is capable of determining the num-
ber of channels used for the transmission of the ship infor-
mation more accurately.

Further, the processor 50 may demodulate the reception
data of the channel CH1, when the reception level of the
channel CH1 is the given value or more, and the reception
level at the frequency of the boundary between the channel
CH1 and the channel CH2 which is adjacent to the channel
CH1 is below the given value.

Such a configuration is capable of demodulating the
reception data of the channel CH1 in distinction from the
reception data of the synthesized channel CH12 of the
channels CH1 and CH2.

Further, the processor 50 may demodulate the reception
data of the channel CH1 and the reception data of the
channel CH2, when the reception levels of the channel CH1
and the channel CH2 which are of the successive frequency
bands are the given value or more, and the reception level at
the frequency of the boundary between the channel CH1 and
the channel CH2 is below the given value.

Such a configuration is capable of demodulating the
reception data of the channel CH1 and the reception data of
the channel CH2 in distinction from the reception data of the
synthesized channel CH12 of the channels CH1 and CH2.

Further, the processor 50 may demodulate the synthesized
data which is obtained by synthesizing the reception data of
the channel CH1 and the channel CH2, when the reception
levels of the channel CH1 and the channel CH2 which are
of the successive frequency bands are the given value or
more, and the reception level at the frequency of the
boundary between the channel CH1 and the channel CH2 is
the given value or more.

Such a configuration is capable of demodulating the
reception data of the synthesized channel CH12 of the
channels CH1 and CH2 in distinction from the reception
data of the channel CH1 and the reception data of the
channel CH2.

Further, the processor 50 may demodulate the synthesized
data which is obtained by synthesizing the reception data of
the channels of a plurality of successive frequency bands,
when the reception levels of the channels of the plurality of
successive frequency bands are the given value or more, and
the reception level at the frequency of each boundary
between the adjacent channels is the given value or more.

Such a configuration is capable of demodulating the
reception data of the synthesized channel in distinction from
the reception data of the single channel.

Further, the processor 50 may determine the reception
data to be demodulated based on the comparison result of the
reception level of the channel with the threshold TH1, and
the comparison result of the reception level at the boundary
frequency with the threshold TH2 which is different from the
threshold TH1.

Such a configuration can determine the number of chan-
nels used for the transmission of the ship information more
accurately, compared with the configuration in which the
reception level is detected using a common threshold.

Further, the ship information may include at least any one
of the identification code, the name, the position, the course,
the velocity, and the destination of a ship.

Such a configuration allows the exchange of the useful
information on the ship 1.

Further, the ship information exchange method according
to this embodiment may be a ship information exchange
method in the ship information exchange device 101. In this
ship information exchange method, the radio signal may first
be received. Next, the reception data of the channels CH1-
CH6 used for the transmission of the ship information may
be generated based on the radio signal. Next, the reception
levels of the channels CH1-CH6 may be detected. Next, the
reception data to be demodulated may be determined
according to the detection result of the reception levels.
Next, the reception data to be demodulated may be demodu-
lated.

The method in which the reception data to be demodu-
lated is determined according to the reception levels of the
channels CH1-CH6 is capable of selectively demodulating
the reception data including the ship information, compared
with the configuration in which the six reception data
included in the radio signals of the channels CH1-CH6 are
demodulated sequentially and repeatedly in a time-divided
fashion regardless of whether the ship information is
included in the radio signals. Thus, it is capable of suppress-
ing the increase in the processing load when demodulating
the reception data which does not include the ship informa-
tion, thereby accelerating the responses of various process-
ings. Therefore, it is capable of reducing the demodulation
processing load and reducing the processing cost and prod-
uct cost for the demodulation.

The above embodiment should be considered to be illus-
trative but not to be restrictive. The scope of the present
disclosure is indicated not by the above-described detailed
description but by the appended claims, and it is intended
that the present disclosure encompasses every modification
within the equivalent meaning and scope of the claims.

Terminology

It is to be understood that not necessarily all objects or
advantages may be achieved in accordance with any par-
ticular embodiment described herein. Thus, for example,
those skilled in the art will recognize that certain embodi-
ments may be configured to operate in a manner that
achieves or optimizes one advantage or group of advantages
as taught herein without necessarily achieving other objects
or advantages as may be taught or suggested herein.

All of the processes described herein may be embodied in,
and fully automated via, software code modules executed by
a computing system that includes one or more computers or
processors. The code modules may be stored in any type of
non-transitory computer-readable medium or other com-
puter storage device. Some or all the methods may be
embodied in specialized computer hardware.

Many other variations than those described herein will be
apparent from this disclosure. For example, depending on
the embodiment, certain acts, events, or functions of any of
the algorithms described herein can be performed in a
different sequence, can be added, merged, or left out alto-
gether (e.g., not all described acts or events are necessary for
the practice of the algorithms). Moreover, in certain embodi-
ments, acts or events can be performed concurrently, e.g.,
through multi-threaded processing, interrupt processing, or
multiple processors or processor cores or on other parallel
architectures, rather than sequentially. In addition, different
tasks or processes can be performed by different machines
and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

DESCRIPTION OF REFERENCE CHARACTERS

1 Ship
10 Receiver
11 Antenna
12 Amplifier
20 Generator
21 Mixer
22 A/D Converter
23 Filter
24 Transferer
30 Detector
40 Memory
41 Memory Area 50 Processor
101 Ship Information Exchange Device
201 Ship Information Exchange System
SL Signal Wire

What is claimed is:

1. A ship information exchange device, comprising:
a receiver configured to receive a radio signal;
a generator configured to generate reception data of a plurality of channels used for transmission of ship information based on the radio signal;
a detector configured to detect a reception level of each of the channels; and
a demodulator configured to demodulate the reception data and determine the reception data to be demodulated according to the detection result of the reception levels.

2. The ship information exchange device of claim 1, wherein the demodulator determines the number of channels used for the transmission of the ship information based on the detection result, and determines the reception data to be demodulated based on the determination result.

3. The ship information exchange device of claim 2, wherein the detector further detects a reception level at a frequency of a boundary between adjacent channels.

4. The ship information exchange device of claim 3, wherein, when the reception level of a first channel is a given value or more, and the reception level at a frequency of a boundary between the first channel and a second channel adjacent to the first channel is below the given value, the demodulator demodulates the reception data of the first channel.

5. The ship information exchange device of claim 3, wherein when the reception levels of the first channel and the second channel that are channels of successive frequency bands are the given value or more, and the reception level at the frequency of the boundary between the first channel and the second channel is below the given value, the demodulator demodulates the reception data of the first channel and the reception data of the second channel.

6. The ship information exchange device of claim 4, wherein when the reception levels of the first channel and the second channel that are channels of successive frequency bands are the given value or more, and the reception level at the frequency of the boundary between the first channel and the second channel is below the given value, the demodulator demodulates the reception data of the first channel and the reception data of the second channel.

7. The ship information exchange device of claim 3, wherein, when the reception levels of the first channel and the second channel that are channels of successive frequency bands are the given value or more, and the reception level at the frequency of the boundary between the first channel and the second channel is the given value or more, the demodulator demodulates synthesized data obtained by synthesizing the reception data of the first channel and the reception data of the second channel.

8. The ship information exchange device of claim 6, wherein, when the reception levels of the first channel and the second channel that are channels of successive frequency bands are the given value or more, and the reception level at the frequency of the boundary between the first channel and the second channel is the given value or more, the demodulator demodulates synthesized data obtained by synthesizing the reception data of the first channel and the reception data of the second channel.

9. The ship information exchange device of claim 3, wherein, when each of the reception levels of channels of a plurality of successive frequency bands is the given value or more, and the reception level at the frequency of each of the boundaries between the adjacent channels is the given value or more, the demodulator demodulates synthesized data obtained by synthesizing the reception data of the channels of the plurality of successive frequency bands.

10. The ship information exchange device of claim 8, wherein, when each of the reception levels of channels of a plurality of successive frequency bands is the given value or more, and the reception level at the frequency of each of the boundaries between the adjacent channels is the given value or more, the demodulator demodulates synthesized data obtained by synthesizing the reception data of the channels of the plurality of successive frequency bands.

11. The ship information exchange device of claim 3, wherein the demodulator determines the reception data to be demodulated based on a comparison result of the reception level of the channel with a first threshold, and a comparison result of the reception level at the frequency of the boundary with a second threshold different from the first threshold.

12. The ship information exchange device of claim 10, wherein the demodulator determines the reception data to be demodulated based on a comparison result of the reception level of the channel with a first threshold, and a comparison result of the reception level at the frequency of the boundary with a second threshold different from the first threshold.

13. The ship information exchange device of claim 1, wherein the ship information includes at least any one of an identification code, a name, a position, a course, a velocity, and a destination of the ship.

14. The ship information exchange device of claim 12, wherein the ship information includes at least any one of an identification code, a name, a position, a course, a velocity, and a destination of the ship.

15. A ship information exchange method in a ship information exchange device, comprising:
receiving a radio signal;
generating reception data of a plurality of channels used for transmission of ship information based on the radio signal;
detecting a reception level of each of the channels;
determining the reception data to be demodulated according to the detection result of the reception levels; and
demodulating the determined reception data to be demodulated.

16. A non-transitory computer-readable recording medium storing a program causing a processor of a device to execute processing, the processor configured to control operation of the device, the processing comprising:
receiving a radio signal;
generating reception data of a plurality of channels used for transmission of ship information based on the radio signal;
detecting a reception level of each of the channels;
determining the reception data to be demodulated according to the detection result of the reception levels; and
demodulating the determined reception data to be demodulated.

* * * * *